United States Patent [19]

Andersson et al.

[11] Patent Number: 4,705,296
[45] Date of Patent: Nov. 10, 1987

[54] SEAT BELT PRE-TENSIONING DEVICE

[75] Inventors: Sture R. Andersson, Nacka; Lars Y. Haland, Falsterbo; Bengt O. J. S. Mörner, Hovas, all of Sweden

[73] Assignee: Autoliv Development AB, Vargarda, Sweden

[21] Appl. No.: 831,523

[22] Filed: Feb. 20, 1986

[30] Foreign Application Priority Data

Feb. 21, 1985 [GB] United Kingdom ................ 8504452
Jan. 9, 1986 [GB] United Kingdom ................ 8600469

[51] Int. Cl.⁴ .......................................... B60R 21/10
[52] U.S. Cl. ................................... 280/806; 297/480
[58] Field of Search ................ 280/801, 806; 297/480

[56] References Cited

U.S. PATENT DOCUMENTS 4,257,626 3/1980 Addmeit .............................. 280/806
4,435,000 3/1984 Chiba et al. ........................ 280/806
4,458,921 7/1984 Chiba et al. ........................ 280/806

Primary Examiner—David M. Mitchell
Assistant Examiner—Kenneth R. Rice
Attorney, Agent, or Firm—Spencer & Frank

[57] ABSTRACT

A seat belt pre-tensioning device is adapted to be mounted on a vehicle and includes a buckle to receive a seat belt buckle. The device incorporates components which are responsive to a predetermined deceleration of the vehicle and which move to permit spring-loaded components to apply a force to move the buckle to apply a tension to the seat belt.

13 Claims, 9 Drawing Figures

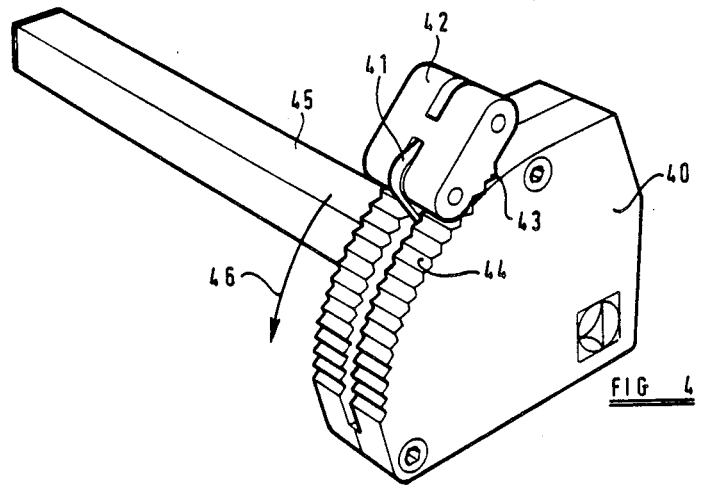
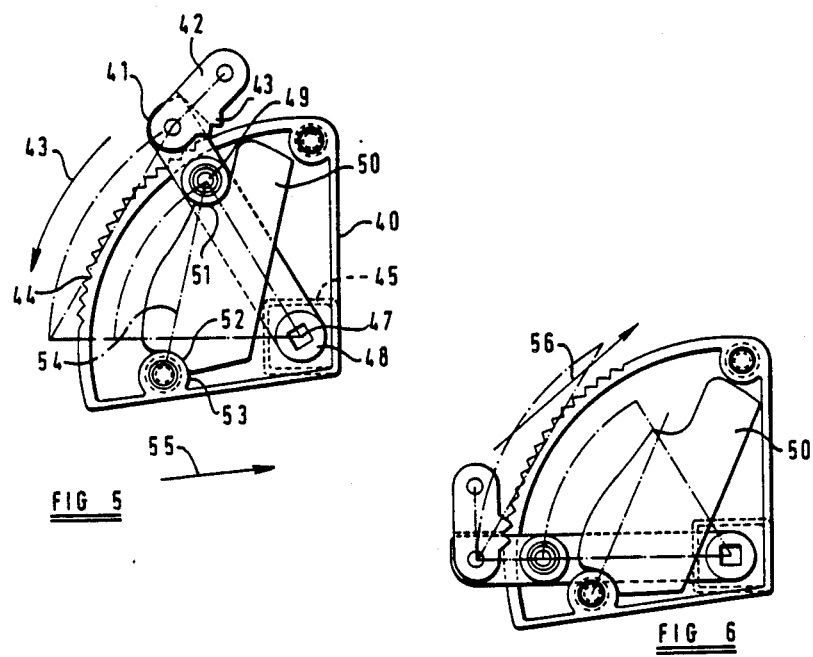

SEAT BELT PRE-TENSIONING DEVICE

BACKGROUND OF THE INVENTION

This invention relates to a seat belt pre-tensioning device, and more particularly to a seat belt pre-tensioning device adapted to tension a seat belt when an accident occurs.

When an accident occurs involving a motor car it is not unusual for the motor car to be decelerated very rapidly, and in some cases the car can be considered to stop virtually instantaneously. When this happens the occupants of the vehicle, who have their own momentum which is related to the speed of the car before he accident, do not stop immediately, but tend to continue to travel forwardly. It is to arrest this forward movement, and to prevent the occupants of the car from colliding with parts of the car that are now stationary, such as the steering wheel, that seat belts are worn.

It is now common for seat belts fitted with inertia reels to be worn. The inertia reel tends to reel up any slack in the seat belt when it has been positioned to restrain the occupant of the car, but is designed to "lock" when subjected to a deceleration in excess of a predetermined deceleration. The inertia reel is thus prevented from rotating to pay out the seatbelt.

If a car fitted with such inertia seat belts is involved in an accident, when the car is decelerated rapidly the occupants of the car will still tend to move forwards as a consequence of their own personal momentum. During a brief initial time period the seat belt which is relatively loosely stretched across the occupant of the car is placed under tension as the occupant moves forwardly relative to the seat. The tension in the belt is applied to the reel of the inertia reel device (which is now "Locked") and an extra length of belt is paid out from the reel as the part of the belt that is wound on the reel is tightened. Thus the occupant of the car still moves forwardly. This can occupy the first 35 milli-seconds or so after the instant of impact, and now the occupant has moved a significant part of the way from the seat to the steering wheel or dashboard. Thus, if the occupant is to be arrested before impact with the steering wheel or dashboard very high retarding forces must be applied to the occupant. These retarding forces must be applied to the occupant of the car in a very short period of time, and thus the retarding forces must be very large if the occupant of the car is to be prevented from impacting with the steering wheel or dashboard. These large forces may thus injure the occupant of the car.

It has been realised that the risk of injuring the occupant of a car with the seat belt if an accident occurs can be reduced if the seat belt arrangement is such that the occupant of the car can be decelerated as soon as possible after the accident occurs. This can be achieved if the occupant is always strapped in tightly, with the seat belt under significant tension at all times. However, it is not practicable to adopt this technique if inertia reels are used.

BRIEF SUMMARY OF THE INVENTION

According to this invention there is provided a vehicle seat belt pretensioning device comprising means to mount the device in the vehicle, means on the device to receive part of the seat belt, means adapted to apply a force to move said seat belt receiving means to apply a tension to the seat belt and means, responsive to a predetermined deceleration, to actuate said force applying means.

Preferably said seat belt receiving means comprises a buckle to receive a tongue connected to the seat belt. The buckle may be a conventional buckle.

Advantageously the seat belt receiving means is connected to a movable member, said force apply means applying a force to the movable member, movement of the movable member being prevented by engagement of a movable part of the device with a stop, said deceleration responsive means being adapted to disengage said movable part of the device and said stop to permit movement of said movable member.

Preferably said movable member moves pivotally about a pivot axis.

Said force applying means may comprise a spring, but preferably said force applying means include a torsion bar.

Advantageously said torsion bar forms part of the said means responsive to a predetermined deceleration. This avoids the necessity of providing a separate deceleration sensor.

Advantageously the torsion bar is arranged to extend transversely of the vehicle, at least one end of the torsion bar being movable in the axial direction of the vehicle, said end of the torsion bar being connected to said movable part of the device so that a predetermined movement of said one end of the torsion bar disengages said movable part of the device from said stop.

In one embodiment the movable part of the device is in the form of a control lever, part of which engages the stop, the control lever being biassed torsionally by the torsion bar, so that when the control lever is disengaged from said stop the control lever will rotate, movement of the control lever causing movement of said seat belt receiving means. The control lever may be connected to the said movable member by means of a pin and slot connection which permits axial movement of the control lever relative to the movable member, but which transmits rotational movement of the control lever to the movable member.

Resilient means may be provided to retain the torsion bar in an initial position, the resilient force applied by the resilient means being overcome when the device is subjected to said predetermined deceleration. Alternatively part of the torsion bar may initially rest in a groove or slot, so that the torsion bar must first lift itself out of this groove or slot before the said movable part of the device can be disengaged from the stop.

In an alternative embodiment of the invention the stop is formed on or constituted by an element 1 which is adapted to move relative to the rest of the device, when the device is subject to a predetermined accelerational or decelerational force; thus disengaging the stop from said part of the device.

In one arrangement the element is a mass which is retained in position with a seat on the mass engaging the movable member or a member associated therewith, the mass being movable, against a retaining bias applied thereto, to a position in which the seat is disengaged from the movable member or member associated therewith.

Preferably said seat on the mass engages the movable member in such a way that the movable member must move against the force applied thereto before the mass can be disengaged from the movable member, the movable member thus applying said retaining bias to the mass.

In another arrangement the stop is formed on a pendulum member, the stop being engaged by a member mounted on the movable member.

Preferably said member mounted on the movable member is pivotally mounted thereon, and has means to engage an abutment connected to the means for mounting the device in a vehicle, and has means to engage said stop.

Preferably means are provided for retaining the movable member in the position that it occupies after the force has been applied thereto. Said retaining means may comprise a ratchet.

Preferably at least some of the movable parts of the device are supported on low friction bearings or the like to ensure that all the movable parts will be able to move freely when they are called upon the move.

BRIEF DESCRIPTION OF THE DRAWINGS

FIG. 4 is a perspective view of a housing and associated torsion bar of a second embodiment of the invention, this second embodiment having two alternate forms;

FIG. 5 is a vertical sectional view of part of one form of the second embodiment with the illustrated components in the normal position;

FIG. 6 is a view corresponding to FIG. 5 showing the illustrated components in the position they will adopt during an accident;

DESCRIPTION OF PREFERRED EMBODIMENTS

Figure 1:
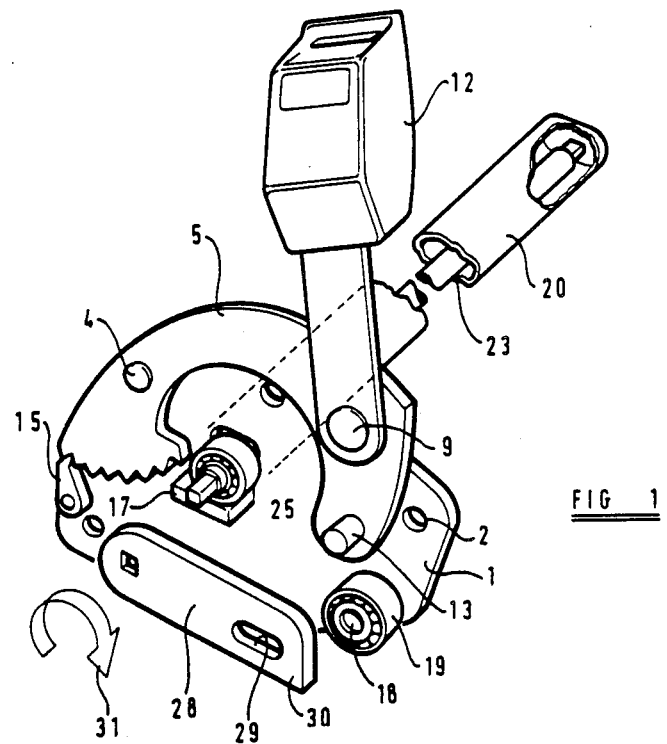
FIG. 1 is a perspective view of the operative parts of one embodiment of a device in accordance with the invention, partly exploded and partly cut-away.
Figure 2:
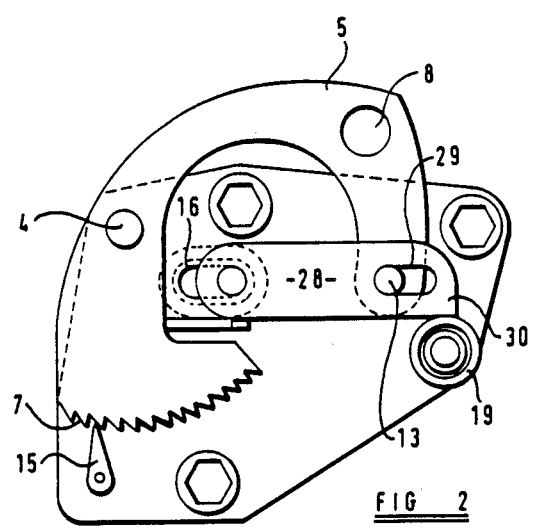
FIG. 2 is an end elevational view of part of the device of FIG. 1.
Figure 3:
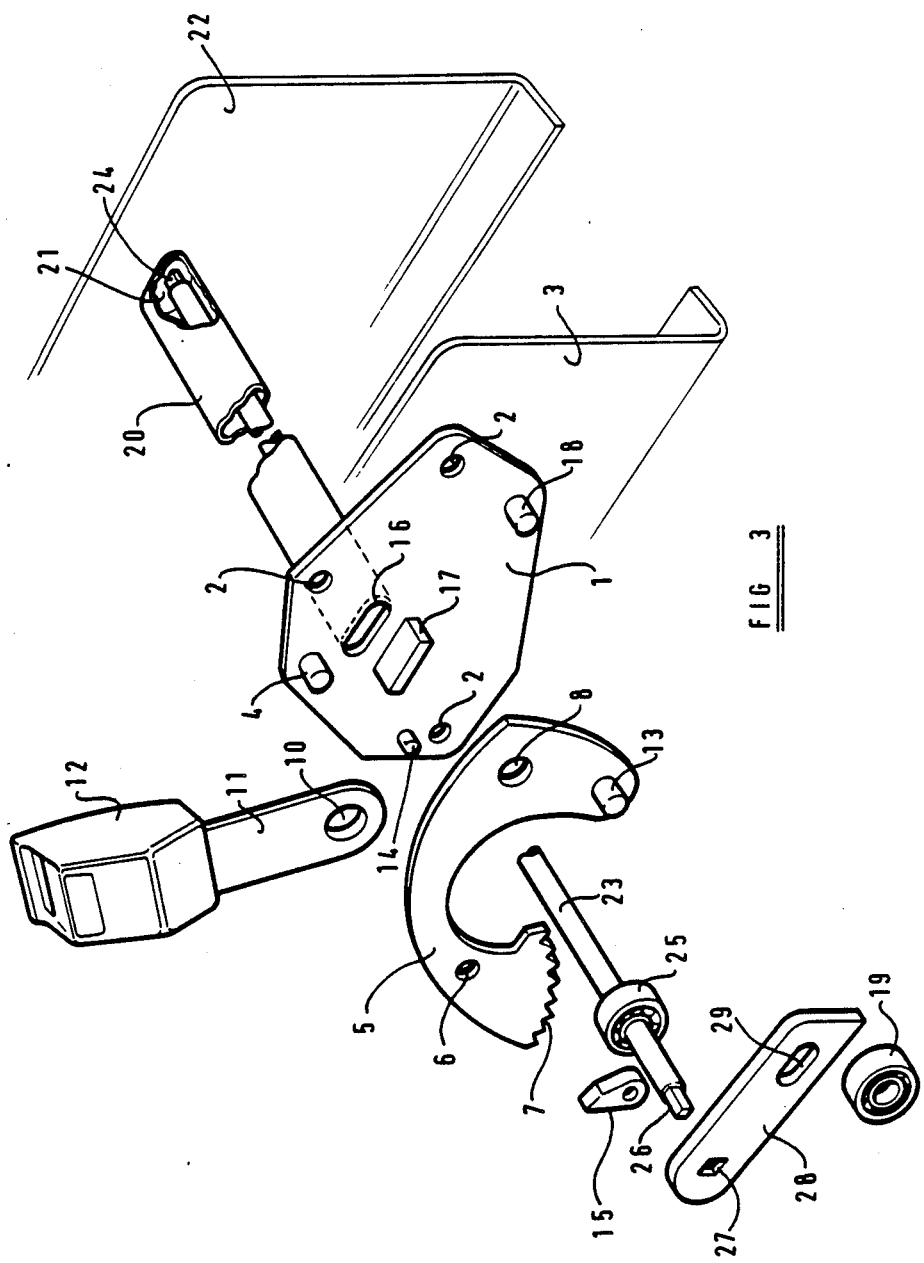
FIG. 3 is an exploded perspective view of the device of FIGS. 1 and 2, with parts cut-away, showing supporting elements in phantom.

Refering to FIGS. 1-3 of the drawings, one embodiment of a device in accordance with the invention includes a support plate 1, which is mounted in a vertical orientation in a vertical plane aligned with the axis of the car. In the illustrated embodiment mounting bolts or the like pass through apertures 2 formed in the plate 1, and secure the plate 1 to a vertical supporting element 3 which in turn is secured to the body of the car.

A first pivot pin 4 extends from one face of the plate 1. An arcuate pivoting member 5 has an aperture 6 therein which receives the pivot pin 4 so that the member 5 is pivotal about the pin 4. The end of the member 5 on one side of the pin 4 is provided with a plurality of serrations or teeth 7. On the other side of the pivot pin 4 the member 5 is provided with an aperture 8 which received a rivet 9 passing through an aperture 10 in a metal strap 11 extending from a conventional seat belt buckle 12. The seat belt buckle 12 is designed to accommodate a tongue mounted on a seat belt.

At a position beyond the aperture 8 the member 5 is provided with a protruding guide pin 13, which protrudes from the face of the planar member 5 which is remote from the plate 1.

The plate 1 is provided with a second pivot pin 14 at a position adjacent the serrated end 7 of the member 5 and this pivot pin carries a spring biassed ratchet member 15 which engages the teeth or serrations 7 in such a way that when the member 5 has executed a clockwise pivotal movement about the pivot pin 4, (as indicated by the arrow 31 in FIG. 1) the member 5 is prevented from rotating in the anti-clockwise direction.

The plate 1 is also provided with an oval aperture 16, the major axis of which is horizontal, and a small projecting ledge 17, having a horizontal upper surface located just below the aperture 16 on the same side of the plate 1 as the pivot pins 4 and 14. The plate 1 has a further pivot pin 18, which carries a roller bearing 19.

Projecting from the other side of the plate 1 is an oval crosssectioned tube 20 which is aligned with the aperture 16 which thus provides access to the interior of the tube. The tube is closed at the end 21 remote from the plate 1. The end 21 of the tube 20 may be supported, and thus it may be connected in some way to a supporting element 22 which corresponds with the supporting element 3.

An elongate torsion bar 23 is mounted in the tube 20. At a first end the torsion bar 23 has a square cross-sectioned projecting peg 24 which is retained in a correspondingly shaped aperture formed in the closed end 21 of the tube 20. The torsion bar 23 passes through the tube 20 and projects through the aperture 16. The projecting part of the torsion bar 23 carries a roller bearing 25 which rests on the upper surface of the ledge 17. The protruding part of the torsion bar then terminates with a square crosssectioned peg 26 which is received in a correspondingly shaped aperture 27 in a control lever 28. The control lever 28 defines an elongate slot 29 which accommodates the guide pin 13 of the member 5. When the described device is in its initial condition the torsion bar is applying a considerable force to the control lever 28, tending to rotate the control lever 28 in a clockwise direction about the end of the torsion bar 23. However, as can be seen from FIG. 2, the end 30 of the control lever 28 rests on the bearing 19, thus preventing rotation of the control lever 28.

When the described device has been mounted in a motor car, since the plate 1 is vertical and is aligned with the axis of the car, the tube 20 will extend transversely to the axis of the car. If the car is involved in an accident and decelerates with a deceleration in excess of a predetermined deceleration the end of the torsion bar 23 will tend to move forwardly in the slot 16. The reason for this is that the torsion bar itself will have momentum, and, as the car decelerates, the plate 1 will decelerate and the free end of the torsion bar 23 will tend to move forwardly relative to the plate.

Since the end of the torsion bar is mounted on the ledge 17 on a low friction bearing 25, the end of the bar will move freely, and since the control lever 28, which is connected to the torsion bar 23, has the end 30 thereof resting on a low friction bearing 19 the control lever will also move freely. As the end of the torsion bar and the control lever move to the left (as seen in FIG. 2) the guide pin 13 effectively slides along the slot 29 in the control lever 28. When a predetermined movement has taken place the end 30 of the control lever 28 will become disengaged from the low friction bearing 19, and then the control lever will be caused to rotate rapidly in the clockwise direction, due to the torsion force applied thereto by the torsion bar 23. As the control lever 28 rotates, the walls of the slot 29 will engage the guide pin 13, thus causing the member 5 to rotate rapidly about the pin 4. This will move the seat belt buckle 12 downwardly very rapidly, thus applying a considerably tension to the seat belt that engages the buckle within a very short period of time after an accident occurs. This will retain the occupant of the vehicle in the seat, providing maximum effective time to decelerate the occupant of the car before the occupant of the car collides with the steering wheel or dashboard.

As the member 5 rotates about the pin 4, the ratchet member 15 engages the teeth 7 to prevent the member 5 rotating in the opposite direction. Thus, once the described device has operated to place the seat belt under tension, the device is then able to withstand the high forces that may be applied thereto in an accident situation without permitting the buckle 12 to move upwardly.

Many modifications may be effected to the above-described embodiment of the invention without departing from the scope of the invention. For example, the peg 24 of the torsion bar 23 may be located in an elongate slot in the closed end 21 of the tube 20, so that in an accident situation the whole of the torsion bar may move forwardly, instead of just one end moving. It may be desirable to retain the torsion bar in its initial position with resilient means such as springs, the resilient bias applied to the torsion bar having to be overcome before the described device will operate.

FIG. 4 illustrates an alternative embodiment of the invention. In this embodiment a housing 40 is provided, on which is pivotally mounted a member 41 having a connecting element 42 pivotally connected to the free end thereof to which may be connected a conventional seat belt buckle (not shown). The connecting member 42 has integrally formed therewith teeth 43 which cooperate with corresponding teeth 44 formed on the exterior of the housing 40 to form a ratchet. A tubular housing 45 is provided which accommodates a torsion bar adapted to provide a bias on the pivotally mounted member 41.

Means are provided, within the housing 40, adapted to retain the pivotally mounted member 41 in the illustrated position, the retaining means being adapted to be displaced when the described device is subjected to deceleration in excess of a predetermined limit, thus releasing the pivotally mounted member to move, under the influence of the torsion bar, in the direction indicated by the arrow 46. Thus the connecting member 42 will move downwardly and will move a seat belt buckle connected thereto, applying a pre-tension to the seat belt. The teeth 43 on the connecting member 42 will then engage the corresponding teeth 44 provided on the housing 40, in the manner of a ratchet, to retain the connecting member 42, and the associated seat belt buckle, in the lower position.

Figure 7:
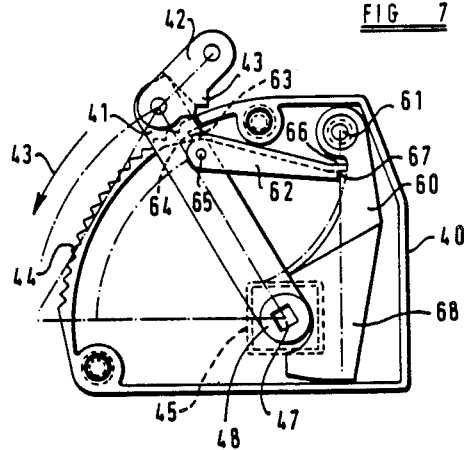
FIG. 7 is a vertical sectional view of part of the alternate form of the second embodiment, with the illustrated components in the normal position.
Figure 8:
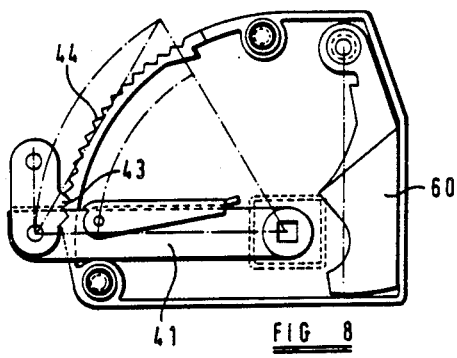
FIG. 8 is a view corresponding with FIG. 7 showing the illustrated components in the condition they will adopt during an accident.
Figure 9:
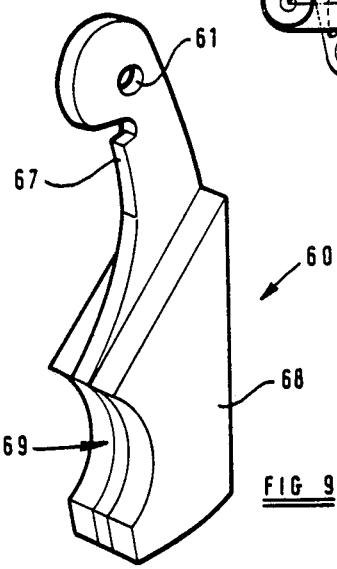
FIG. 9 is a perspective view of the sensor component of FIGS. 7 and 8.

The means which normally retain the pivotally mounted member 41 in the initial elevated position as shown in FIG. 4 may take two different forms. One form is illustrated in FIGS. 5 and 6, whereas another form is illustrated in FIGS. 7 to 9.

Dealing initially with FIGS. 5, 6, it can be seen that the housing 40 is a hollow housing, formed with two substantially mirror-image housing parts which are joined together. The pivotally mounted member 41 is mounted at its lower end, as illustrated, on a square peg 47 which if formed at the end of a circular torsion bar 48 which extends through the square section tubular housing 45. The pivotally mounted member 41 has a protruding boss 49 thereon, on part of the pivotally mounted member 41 which in contained within the hollow housing 40.

A displaceable mass 50 is located within the hollow housing. The displaceable mass 50 may be of any convenient shape, but defines a first arcuate seat 51 adapted to engage the protruding boss 49, and a second arcuate seat 52 adapted to engage a cylindrical boss 53 which accommodates a bolt joining together the two housing - halves that constitute the housing 40. The design of the movable weight 50, and the location of the arcuate seat 51, 52 is such that the bias tending to move the arm 41 in the direction of the arrow 43 imparted by the torsion bar 48 tends to maintain the mass in the illustrated position, thus tending to maintain the arm 41 in the elevated position. The reason for this is that both the arcuate seats 51, 52 extend on both sides of a line 54 which interconnects the centre of the boss 49 and the centre of the boss 53. Thus, in order to move the mass 50 from the illustrated position the arm 41 must be moved upwardly slightly against the bias imparted by the torsion member 48.

The illustrated device is mounted in a motor vehicle in such a way that as the motor vehicle travels forwardly the device travels in the direction illustrated by the arrow 55.

If the motor vehicle in which the device is fitted is subjected to a deceleration the mass 50 will tend to move forwardly, relative to the rest of the device, under its own momentum. If the deceleration is sufficiently rapid, in other words if the deceleration exceeds a predetermined limit, the momentum of the mass 50 relative to the housng 40 will be sufficient to make the arm 41 move against the bias imparted by the torsion bar 48 sufficiently to permit the mass 50 to move forwardly, to the position illustrated in FIG. 6. Once the mass has moved forwardly in this way the seat 51 will become disengaged from the protruding boss 49, and the arm 41 will then be free to move downwardly under the rotational bias imparted to the arm 41 by the torsion bar 48. As the arm 49 moves downwardly the seat belt buckle associated with the member 42 will also move downwardly and will apply a force to the connection member 42 in the direction illustrated by the arrow 56. Since the connecting member 42 is pivotally mounted on the end of the arm 41, this will tend to draw the teeth 43 present on the connecting member 42 into engagement with the corresponding teeth 44 on the housing 40, thus retaining the arm 41 in the lowermost position as illustrated in FIG. 6.

Turning now to FIGS. 7 to 9, another arrangement is illustrated where, instead of a falling mass, a pendulum member is utilised.

As can be seen in FIGS. 7 and 8, a housing 40 contains a pendulum member 60 which is mounted in position by means of a ball and socket joint 61 so that pendulum member can swing backwards and forwards, and can also swing from side to side.

As in the embodiment described above, the lever 41 is pivotally mounted, at its lower end, about a square pen 47 formed at the end of a cylindrical torsion bar 48 contained within the square sectioned tubular housing 45. Pivotally mounted on the arm 41 is a control lever 62. The control lever 62 is of substantially "T" cross-section, and the head of the "T" forms a flange, one end of which 63 engages projections 64 formed on the interior of the housing adjacent the part thereof which defines the ratchet teeth 44. The above described engagement is adjacent a pivot pin 65 which connects the lever 62 to the arm 41. The free end 66 of the lever 62 rests on a small projection 67 formed on the pendulum member 60. The lower part of the pendulum member 68 forms a pendulum mass. The mass is provided with a recess 69 and, when the pendulum member 60 is in the initial position illustrated in FIG. 7, the torsion bar 48 and the lower end of the pivotally mounted lever 41 are located within this recess 69, although they do not actually contact the pendulum member 60.

The bias imparted to the pivotally mounted arm 41 by the torsion bar 48 tends to move the pivotally mounted arm in the direction of the arrow 43. As the arm is biassed to move in this way part of the flange 63 and the lever 62 engages the abutment 64, thus tending to rotate the lever 62 in the clockwise direction about the pivot pin 65, as illustrated. Thus the free end 66 of the lever is forced downwardly into contact with the upper surface of the projection 67 on the pendulum member 60. This serves to apply a certain force to the pendulum member 60, which tends to retain the pendulum member 60 in the position illustrated in FIG. 7. This force must be overcome if the pendulum member is to move to any other position.

If a vehicle in which the presently described device is mounted is decelerated rapidly, due to its momentum, the pendulum 60 wil tend to move about the ball and socket connection 61. If the deceleration is sufficiently rapid the pendulum will move forwardly to the position illustrated in FIG. 8, and the free end 66 of the lever 62 will thus become disengaged from the projection 67. Under the bias applied thereto, the lever 62 will then move in a clockwise direction relative to the arm 41. This will serve to disengage the flange 63 from the abutment 64, and the arm 41 may then move to the position illustrated in FIG. 8, thus applying a pre-tension to the belt. As in the embodiment of FIGS. 5 and 6 the force applied to the buckle of the belt will tend to retain the teeth 43 on the connecting member in engagement with the teeth 44 on the housing.

As can be seen from FIG. 9 the pendulum member 60 may be formed as a three layer laminate or "sandwich". The ball and socket connection 61 is adapted to cooperate with a ball provided on one part of the housing 40. Because of the ball and socket connection this embodiment is sensitive to sideways acceleration/deceleration, and thus the described device will operate in an accident involving a side impact.

Again many modifications may be made to the above described embodiments of the invention without departing from the scope of the invention.

What is claimed is:

1. A vehicle seat belt tensioning device comprising: means for mounting the device in a vehicle; a moveable member mounted on the device, means for receiving part of a seat belt connected to said moveable member; force applying means for applying a force to said moveable member to move said seat belt receiving means in a direction to apply a tension to the seat belt; and means for normally preventing said force applying means from moving said seata belt receiving means, but which are responsive to a predetermined deceleration for actuating said force applying means to permit the force applying means to apply their force to move said seat belt receiving means; and wherein said means for preventing includes a stop which is engaged by part of said moveable member, and said stop is formed on an element which is adapted to move by its own inertia relative to the rest of the device, when the device is subject to a predetermined accelerational or decelerational force, thus disengaging the stop from said part of said member.

2. A device according to claim 1, wherein means are provided for retaining the movable member in the position that it occupies after the force has been applied thereto.

3. A device according to claim 1, wherein said force applying means include a torsion bar.

4. A device according to claim 1, wherein the element is a mass which is retained in position with a seat on the mass engaging the movable member the mass being movable, against a retaining bias applied thereto, to a position in which the seat is disengaged from the movable member.

5. A device according to claim 4, wherein said seat on the mass engages the movable member in such a way that the movable member must move against the force applied thereto before the mass can be disengaged from the movable member, the movable member thus applying said retaining bias to the mass.

6. A device according to claim 1, wherein the stop is formed on a pendulum member, with the stop being engaged by a member mounted on the movable member.

7. A device according to claim 6, wherein said member mounted on the movable member is pivotally mounted thereon, and has means to engage on abutment connected to the means for mounting the device in a vehicle, and has means to engage said stop.

8. A vehicle seat belt pre-tensioning device comprising: means for mounting the device in a vehicle; means on the device for receiving part of a seat belt; force applying means for applying a force to move said seat belt receiving means in a direction to apply a tension to a seat belt connected to said seat belt receiving means, said force applying means including a torsion bar having one end which is movable in the axial direction of the vehicle in response to deceleration of the vehicle, and which is connected to said seat belt receiving means for applying said tension force; and means for normally engaging said one end of said torsion bar for preventing said torsion bar from moving said seat belt receiving means and for disengaging said one end of said torsion bar in response to movement of said one end corresponding to a predetermined deceleration so that said bar may then apply its force to said seat belt receiving means to move same.

9. A device according to claim 8, wherein: said seat belt receiving means is connected to a moveable member; said torsion bar applies said force to said moveable member; movement of the moveable member is prevented by engagement of a moveable part connected to said one end of said torsion bar with a stop; and said moveable part is connected to said one end of said torsion bar so that a predetermined movement of said one end of the torsion bar disengages said part from said stop to permit movement of said moveable member.

10. A device according to claim 9, wherein the torsion bar is arranged to extend transversely of the vehicle.

11. A device according to claim 9, wherein the moveable part of the device is in the form of a control lever, part of which engages the stop, the control lever being biassed torsionally by the torsion bar, so that when the control lever is disengaged from said stop the control lever will rotate, movement of the control lever causing movement of said seat belt receiving means.

12. A device according to claim 11, wherein the control lever is connected to the said movable member by means of a pin and slot connection which permits axial movement of the control lever relative to the movable member, but which transmits rotational movement of the control lever to the movable member.

13. A device according to claim 9, wherein means are provided for retaining the moveable member in the position that it occupies after said force has been applied thereto.

* * * * *

Disclaimer 4,705,296.—*Sture R. Andersson*, Nacka; *Lars Y. Haland*, Falsterbo; *Bengt O. J. S. Morner*, Hovas, all of Sweden. SEAT BELT PRE-TENSIONING DEVICE. Patent dated Nov. 10, 1987. Disclaimer filed May 12, 1989, by the assignee, Autoliv Development AB.

Hereby enters this disclaimer to claims 1, 2 and 6 of said patent.
[ *Offical Gazette July 25, 1989* ]